United States Patent [19]

Fujisaki et al.

[11] Patent Number: 4,856,368
[45] Date of Patent: Aug. 15, 1989

[54] HST (HYDROSTATIC TRANSMISSION) CONTAINING AXLE DRIVE APPARATUS

[75] Inventors: Koichiro Fujisaki; Ryota Ohashi, both of Kobe; Shusuke Nemoto, Yao, all of Japan

[73] Assignee: Kanzaki Kokyukoki Mfg. Co. Ltd., Japan

[21] Appl. No.: 212,173

[22] Filed: Jun. 27, 1988

[30] Foreign Application Priority Data

Jun. 26, 1987 [JP] Japan ................. 62-160652
Jun. 27, 1987 [JP] Japan ................. 62-160690

[51] Int. Cl.$^4$ ............ F16H 57/02; F16H 47/04
[52] U.S. Cl. .................. 74/606 R; 74/687
[58] Field of Search ............ 74/687, 718, 606 R; 60/487

[56] References Cited

U.S. PATENT DOCUMENTS

| | | | |
|---|---|---|---|
| 3,131,580 | 5/1964 | Forster ............... | 74/687 X |
| 3,196,696 | 7/1965 | Ritter ................ | 74/687 X |
| 3,318,092 | 5/1967 | Boydell .............. | 60/487 |
| 3,687,212 | 8/1972 | Forster .............. | 180/66 R |
| 3,756,030 | 9/1973 | Ruhl et al. ......... | 60/487 |
| 4,098,144 | 7/1978 | Besel et al. ........ | 74/687 |
| 4,261,226 | 4/1981 | Orshansky, Jr. et al. .... | 74/687 |
| 4,627,237 | 12/1986 | Hutson .............. | 60/487 |

FOREIGN PATENT DOCUMENTS

| | | | |
|---|---|---|---|
| 1159280 | 12/1963 | Fed. Rep. of Germany ........ | 74/687 |
| 1951233 | 4/1971 | Fed. Rep. of Germany ........ | 74/687 |
| 3239223 | 6/1984 | Fed. Rep. of Germany ........ | 74/687 |
| 0480955 | 5/1953 | Italy .................. | 60/487 |
| 58-20924 | 2/1983 | Japan ................. | 74/687 |
| 60-1028 | 1/1985 | Japan ................. | 74/687 |
| 61-27366 | 2/1986 | Japan ................. | 74/687 |
| 61-261127 | 11/1986 | Japan ................. | 74/687 |
| 62-85759 | 4/1987 | Japan . | |
| 0291296 | 6/1953 | Switzerland ......... | 60/487 |
| 924185 | 8/1960 | United Kingdom . | |
| 2032586 | 9/1979 | United Kingdom . | |

*Primary Examiner*—Leslie A. Braun
*Assistant Examiner*—Harold F. Macris
*Attorney, Agent, or Firm*—Saidman, Sterne Kessler & Goldstein

[57] ABSTRACT

An axle driving apparatus for a small-sized vehicle, such as a tractor, which divides its axle casing into first and second axle casings. A hydraulic pump, provided with a vertical pump shaft, is disposed within one of the axle casings. A hydraulic motor, provided with a horizontal motor shaft; a speed reduction shaft; and a differential gear unit, are disposed within the other of said axle casings. This configuration allows a driving force to be transmitted from the vertical pump shaft to the horizontal motor shaft.

5 Claims, 6 Drawing Sheets

HST (HYDROSTATIC TRANSMISSION) CONTAINING AXLE DRIVE APPARATUS

FIELD OF THE INVENTION

The present invention relates to an axle-driving apparatus which disposes an HST (Hydrostatic Transmission) system speed change gear in an axle casing on a vehicle, such as a tractor.

PRIOR ART

An engine on a vehicle, such as a tractor, is generally disposed such that a crank shaft is directed longitudinally of the vehicle body.

Examples of such are disclosed in U.S. Pat. Nos. 3,196,696 and 3,131,580 and in United Kingdom Pat. Nos. 2,032,586 and 924,185.

A small-sized, lightweight engine which vertically disposes a crank shaft has been produced at low manufacturing cost. An axle driving apparatus housing the hydrostatic transmission (HST) used in the small-sized vehicle containing such an engine is in demand.

The applicant of the present invention has proposed the following examples of axle-driving apparatus for a vertical crank shaft type engine: the Japanese Utility Model Laid-Open No. Sho 62-87253, Utility Model Laid-Open No. Sho 62-85759 and Patent Laid-Open No. Sho 61-261127.

The above examples all attach the HST system speed change gear, in which a pump shaft and a motor shaft are disposed vertically in parallel to each other, on the upper surface of an axle casing. This casing houses therein a reduction gear, a differential gear and an axle. The motor shaft is inserted into the axle casing and is connected to the reduction gear.

As a result, the HST system speed change gear, provided separate from the axle casing, is supported thereto and is exposed to the exterior. Therefore, the vehicle is large in size as a whole, and its gross vehicle weight is also larger.

Furthermore, a bevel gear must be interposed in both of the driving systems in order to drive the horizontally disposed axle by a motor shaft of a hydraulic motor which is disposed vertically at the exterior of the vehicle.

SUMMARY OF THE INVENTION

An object of the present invention is to provide an axle driving apparatus which disposes a hydraulic motor and a hydraulic pump for an HST system speed change gear, in an axle casing, in order to eliminate the inconvenience experience by the above described examples. Thus, the apparatus is usable for a small-sized vehicle including a vertical crank shaft type engine.

The present invention comprises a hydraulic pump having a pump shaft which is disposed vertical to the axle of the vehicle. A motor shaft of the hydraulic motor is in parallel to the pump shaft. Therefore, the hydraulic motor, whose direction of rotation is conventionally changed by use of a bevel gear, instead receives engine power to change the direction of rotation by an oil passage disposed between the hydraulic pump and the hydraulic motor which bends at a right angle. This structure eliminates the need of conventional apparatus such as a bevel gear to change the direction of rotation.

Furthermore, at one of the axle casings is provided a vertical bearing wall for supporting the axle or the like. Alternatively, a center plate may be fixedly interposed between the right and left axle casings. The vertical bearing wall or the center plate form an oil passage which connects the hydraulic motor and hydraulic pump.

Other objects and aspects of the invention will become apparatus from the following description of the preferred embodiment with reference to the accompanying drawings.

DETAILED DESCRIPTION OF THE PREFERRED EMBODIMENT

Figure 1:
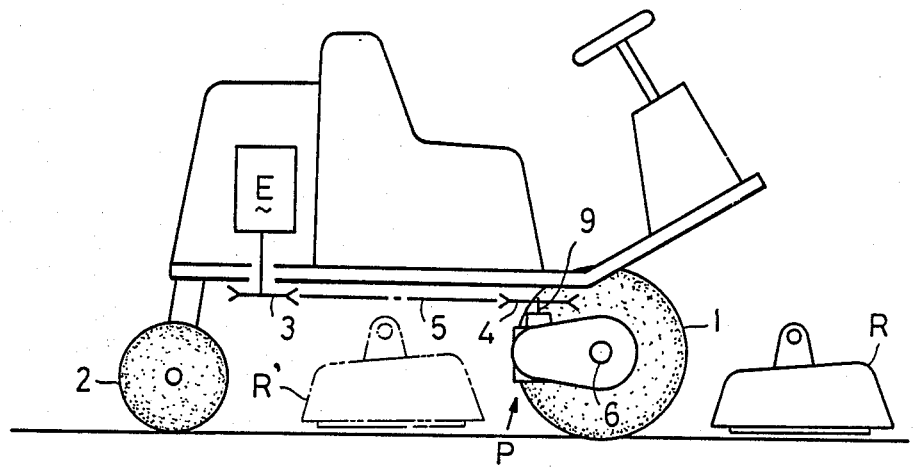
FIG. 1 is a side view of a tractor equipped with axle-driving apparatus of the present invention.

Referring now to FIG. 1, a tractor equipped with a mower unit R will be described.

The tractor comprises a vehicle body supported between front driving wheels 1 and rear steering wheels 2, and an engine E from which projects a vertical crank shaft.

An output pulley 3 is fixed to the vertical crank shaft of engine E so that a driving force is transmitted from output pulley 3 to an input pulley 4 which is fixed to the pump shaft 9 at the hydraulic pump P through a horizontally stretched V-belt 5.

The axles 6L and 6R, first and second respectively, of the tractor project laterally and are disposed horizontally, while pump shaft 9 of the hydraulic pump P is vertically disposed and is in parallel to the vertical crank shaft.

Mower unit R is usable as a front mower unit R as shown in FIG. 1 or may be mounted to the center of tractor as a mid-mower unit R, shown in phantom in FIG. 1.

Figure 2:
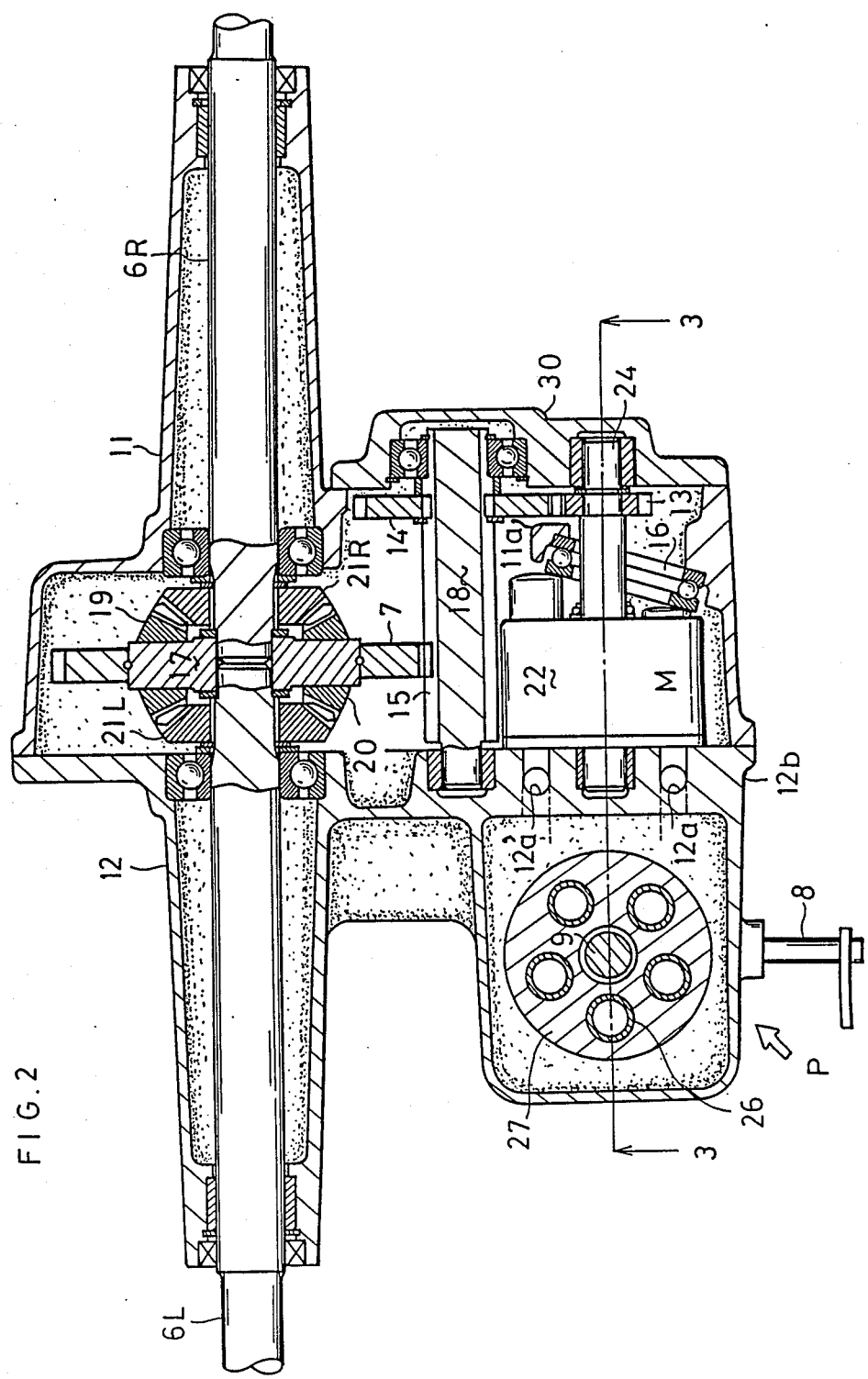
FIG. 2 is a sectional plan view of the axle-driving apparatus of FIG. 1 taken on the line 2—2 in FIG. 3.

With particular reference to FIG. 2, an axle casing is shown, supporting axles 6L and 6R. The axle casing is flat and horizontally disposed, as shown in FIG. 1.

The axle casing or housing is divided laterally along axle 6L into two sections. One first axle casing 12 is formed integral with an axle support for supporting axle 6L and with a hydraulic pump casing. The other or second axle casing 11 is formed integral with an axle support for supporting axle 6R and with a hydraulic motor casing.

A thick, vertical wall 12b is formed at the junction between casing 12 and casing 11. Oil passages 12a are formed in wall 12b. Each passage 12a extends from hydraulic pump P to hydraulic motor M.

Casing 11 houses hydraulic motor M; a differential gear; a reduction gear unit, provided between a motor shaft 24 and a ring gear 7 at the differential gear; and a large diameter gear 14 and a small diameter gear 15 on speed reduction shaft 18.

Figure 3:
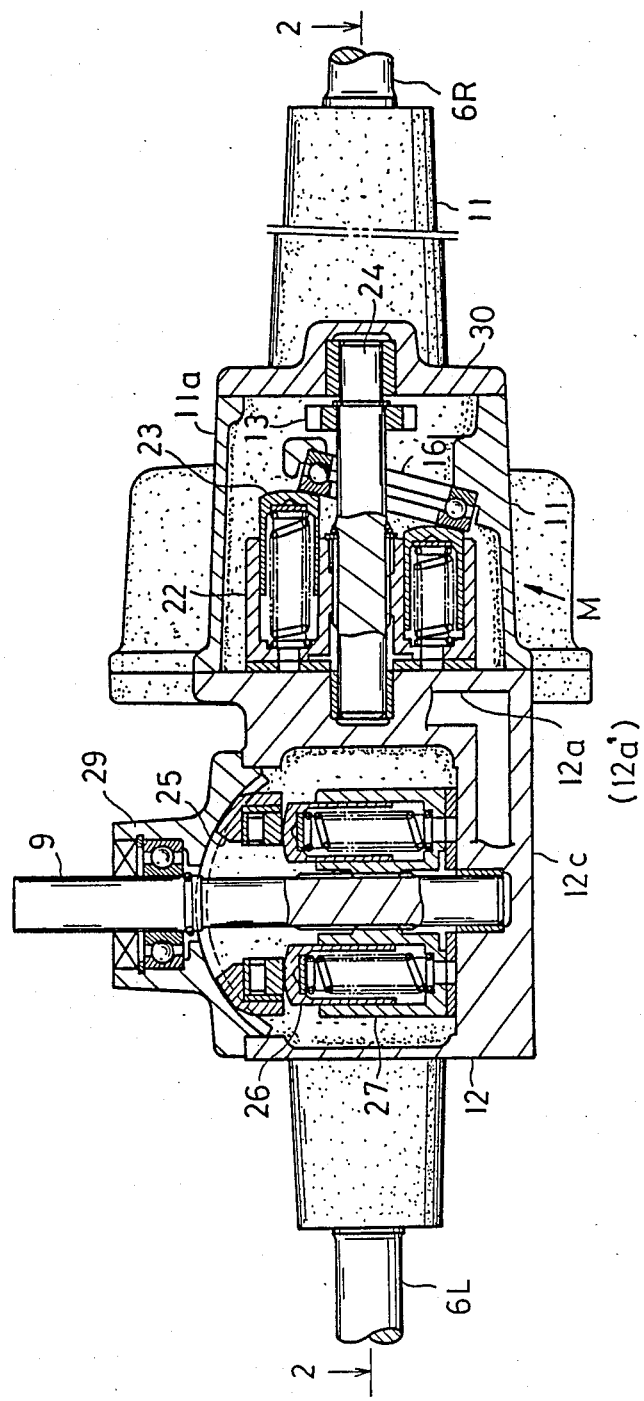
FIG. 3 is a sectional view taken on the line 3—3 in FIG. 2.

The casing for hydraulic pump P is integral with the casing 12. Pump P is attached to casing 12 such that pump shaft 9 is disposed perpendicular to a bottom wall 12c of the left-hand axle casing 12 (FIG. 3).

Casing 12 is open at its upper end. The opening is covered by a lid 29. This allows shaft 9 to be perpendicularly disposed to transmit a driving force to drive hydraulic pump P.

A swash plate rotating shaft 8 projects laterally from casing 12 and connects with a speed change lever (not shown) of the tractor through a linkage mechanism (not shown). The swash plate rotating shaft 8 also rotates swash plate 25 in hydraulic pump P.

Pressure oil discharged from hydraulic pump P is guided into a cylinder formed at a rotor 22 of hydraulic motor M through oil passages 12a perforating the bottom wall 12c and vertical bearing wall 12b at casing 12, thereby driving hydraulic motor M. The oil, after driving hydraulic motor M, is returned to hydraulic pump P through an oil passage 12a (FIG. 3).

Rotation of rotor 22, at hydraulic motor M, is transmitted to motor shaft 24 and then to gear 14 on speed reduction shaft 18, through gear 13 which is fixed to motor shaft 24.

Another small diameter gear 15, at speed reduction shaft 18, engages a ring gear 7 disposed at the differential gear unit.

The differential gear unit is provided without a gear casing, a pinion shaft 17 is fixed within an inner diametric bore of ring gear 7. At the central portion of the pinion shaft 17 is formed an opposite pivot bore, through which axles 6L and 6R abut, at the inner ends thereof, against each other.

Pinion gears 19 and 20 are freely fitted onto pinion shaft 17, gears 19 and 20 engage with the differential side gears 21L and 21R disposed on axles 6L and 6R respectively. Preferably, gears 21L and 21R are splined on axles 6L and 6R.

Now referring more particularly to FIG. 3, the axle driving apparatus of the present invention comprises oil passages 12a and 12a' through which oil is transported for the hydraulic motor M, from bottom wall 12c to vertical bearing wall 12b which are bent perpendicularly in the direction of the driving force.

Hydraulic pump P includes a rotor 27 fitted in spline onto and driven by pump shaft 9. Pistons 26 are fitted reciprocally within cylinders which are open at rotor 27 and spaced at regular intervals. Pistons 26 are always biased at their heads toward swash plate 25 through a spring which is interposed between each piston 26 and rotor 27.

When rotor 27 is driven by rotation of pump shaft 9, the head of each piston 26 revolves while abutting against swash plate 25 whose angle is changeable to a desired position. Pistons 26 repeat movement in reciprocation, and actuate pump P to meet with the particular angle of swash plate 25, thereby discharging the oil.

The oil passes through oil passages 12a at bearing wall 12b and bottom wall 12c and is transported into the cylinder open within the rotor 22 at hydraulic motor M, thereby projecting each piston 23 which is movable in reciprocation.

A fixed swash plate 16 is fixed to a swash plate holder 11a at casing 11, a head of piston 23 always abuts against swash plate 16. When piston 23 is pressed onto the slanted surface of the fixed swash plate 16 by the pressure created by the moving oil, a torque is generated at rotor 22, whereby motor shaft 24, fitted in spline to rotor 22, rotates.

When piston 23 is forced by plate 16 into rotor 22, the oil in the piston cylinder is pushed out therefrom, and is returned through the passage 12a to an inlet at hydraulic pump P.

A bearing lid 30 is attached to casing 11. Lid 30 provides a bearing which supports the axially right-side ends of the speed reduction shaft 18 and motor shaft 24.

Next, explanation will be given on a modified embodiment of the axle-driving apparatus of the invention with reference to FIGS. 4 and 5.

Figure 4:
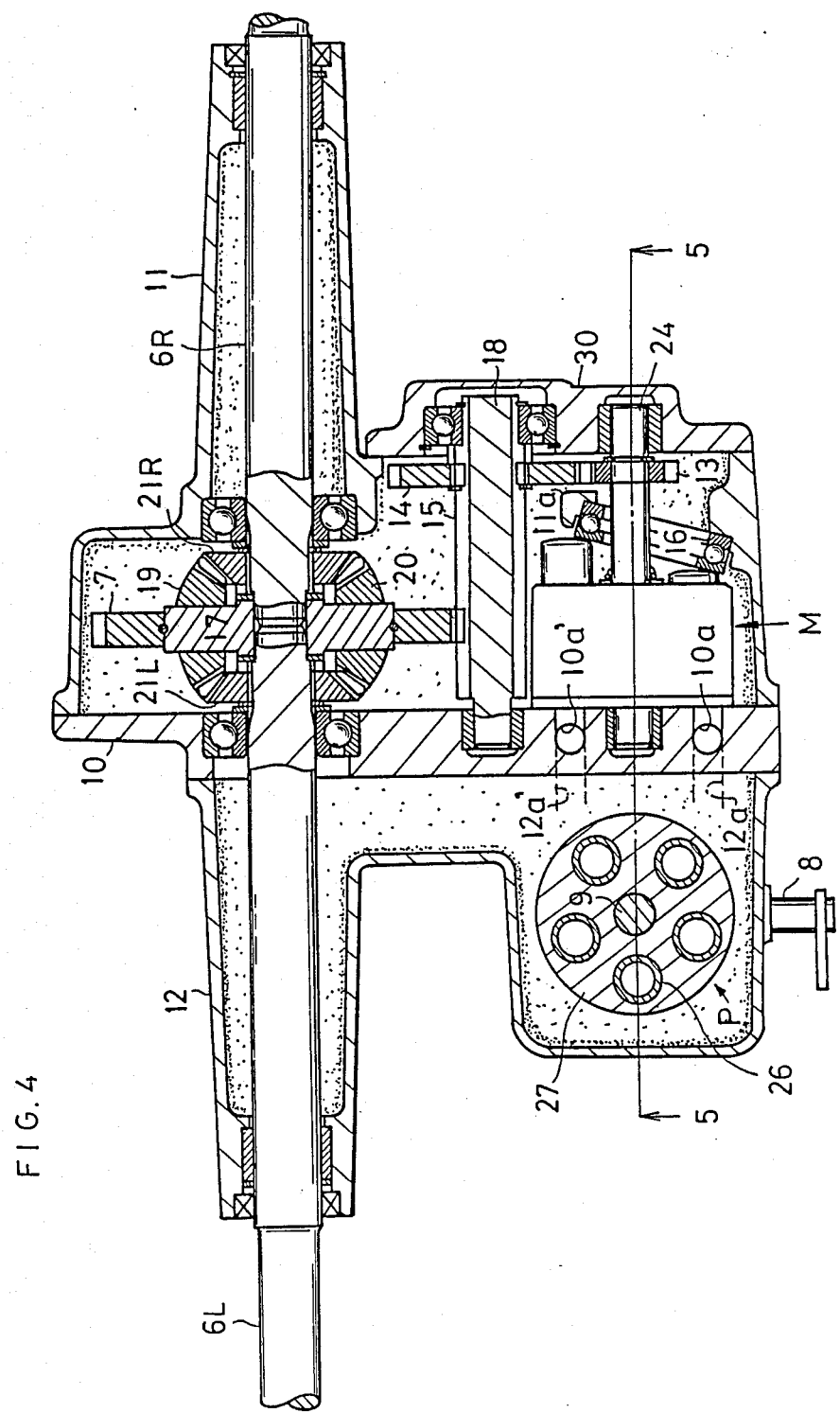
FIG. 4 is a sectional plan view similar to FIG. 2 of a modified embodiment of the present invention taken on the line 4—4 in FIG. 5.

The embodiment in FIG. 4 separates the left-side axle casing 12 from the thick bearing vertical wall 12b, as shown in FIGS. 2 and 3, and provides instead an independent center plate 10.

Center plate 10 is fixedly sandwiched between the left half axle casing 12 and right half axle casing 11. Oil passages 10a and 10a' are provided within plate 10.

Figure 5:
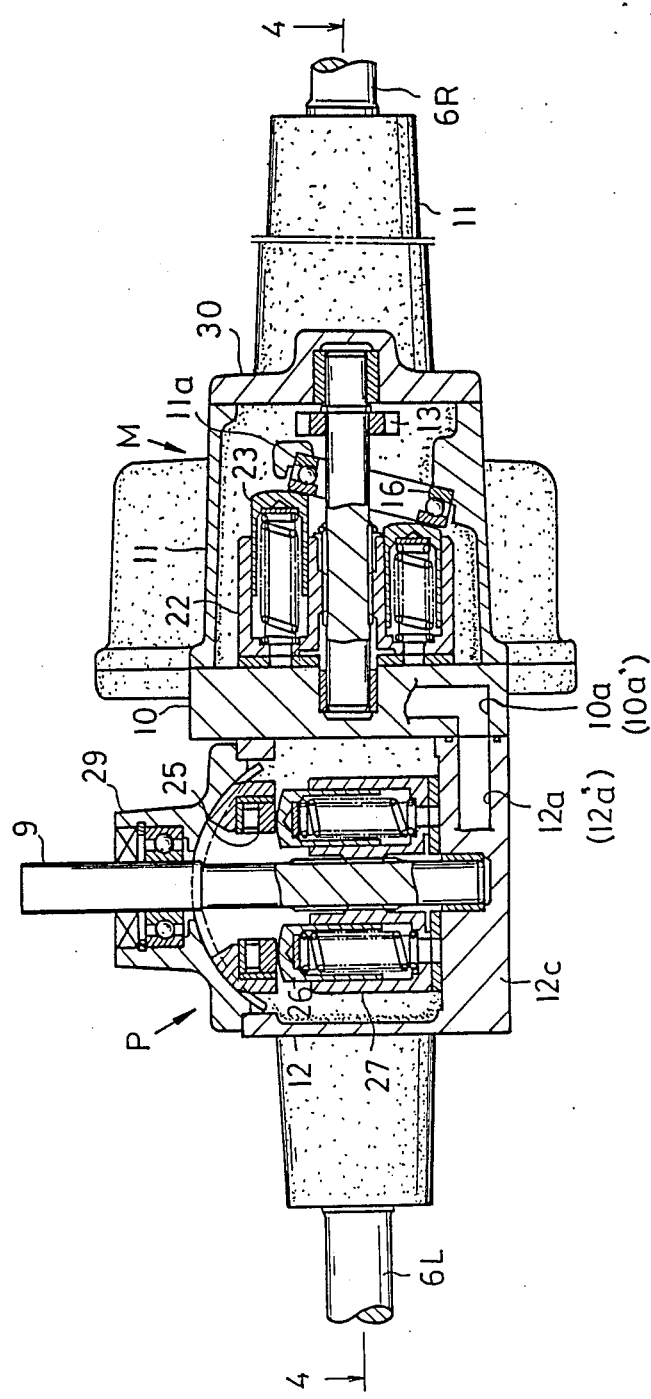
FIG. 5 is a sectional view taken on the line 5—5 in FIG. 4.

Oil passages 10a and 10a' communicate with oil passages 12a and 12a' which perforate the bottom wall 12c of the left half axle casing 12 respectively (see FIG. 5). Oil pressure is thereby allowed to circulate between the hydraulic pump P and the hydraulic motor M through the above-mentioned oil passages 10a, 10a', and 12l'.

Center plate 10 is not only provided with oil passages 10a and 10a', but also serves as a bearing support wall for journaling one end of each of the axle 6L, speed reduction shaft 18 and motor shaft 24.

Figure 6:
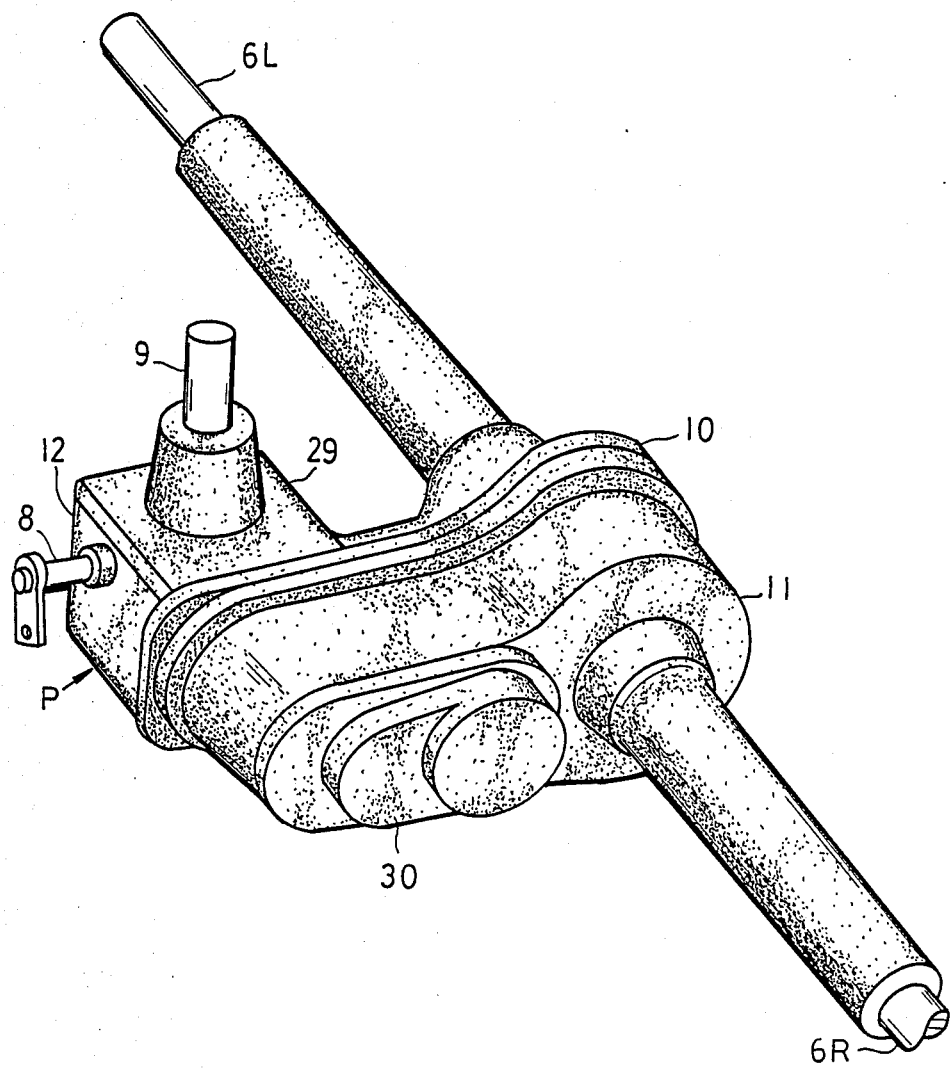
FIG. 6 is a perspective view of the axle driving apparatus of FIGS. 4 and 5.

FIG. 6 is a perspective view of the HST system containing axle driving apparatus of the invention as a whole.

The axle driving apparatus of the present invention has the following advantages over the prior art:

Since the hydraulic pump P and hydraulic motor M are housed in the axle casing supporting the axles, a separate HST casing is eliminated and the axle driving apparatus is therefore made compact.

When engine E of the vertical crank shaft is loaded, it is required to change the direction of the driving force transmitted from the vertical crank shaft to the horizontal axles 6L and 6R. Conventionally, a bevel gear is used to change the driving force direction. In the present invention, however, hydraulic pump P is housed within the first axle casing 12, having its pump shaft 9 perpendicular to the bottom wall 12c of the casing 12. Hydraulic motor M is disposed in parallel to the axles 6L and 6R. Hence, oil passages 12a, 12a', 10a and 10a' are positioned at right angles to one another, without the need to provide a bevel gear in order to change the direction of the driving force.

Furthermore, in one embodiment of the invention, hydraulic pump P is attached to bottom wall 12c, and hydraulic motor M is attached to bearing vertical wall 12b. As a result, oil passge 12a and 12a' at the bottom wall 12c, and bearing vertical wall 12b of casing 12' connect hydraulic motor M and hydraulic pump P, whereby there is no need to provide an oil passage at the second axle casing 11.

In another embodiment of the present invention, the axle casing is divided into a first axle casing 12 and a second axle casing 11, with center plate 10 interposed therebetween. Oil passages formed within the center plate 10 connect hydraulic motor M and hydraulic pump P. Center plate 10 increases the bearing strength of the apparatus and simplifies assembly of the axle driving apparatus.

Although several embodiments have been described, they are merely exemplary of the invention and are not to be construed as limiting the invention which is now defined by the appended claims.

What is claimed is:

1. An axle driving apparatus housing a hydrostatic transmission, comprising:
   an axle housing;
   said axle housing having therein a first axle, a second axle and a differential gear unit;
   said axle housing being divided into a first axle casing and a second axle casing portion;
   a hydraulic pump, having a pump shaft disposed perpendicular to said first axle and said second axle, disposed within one of said first and second axle casings;
   a hydraulic motor, having a motor shaft disposed parallel to said first axle and said second axle;
   a speed reduction transmission for associating said motor shaft with a ring gear of said differential gear unit; and
   said hydraulic motor, said speed reduction transmission, and said differential gear unit disposed within the other of said first and second axle casings.

2. An axle driving apparatus as set forth in claim 1, wherein said hydraulic pump is provided at a bottom wall of one of said first and second axle casings.

3. An axle driving apparatus as set forth in claim 2, wherein said pump shaft projects perpendicularly from said axle casings.

4. An axle driving apparatus as set forth in claim 1, further comprising a vertical bearing wall;
   said bearing wall being formed in one of said first and second axle casings at the division of said first and second axle casings;
   said bearing wall being greater in thickness than the remained of said one of said first and second axle casings;
   said bearing wall supporting said first and second axles and said speed reduction transmission;
   said hydraulic motor being attached to a side wall of said other of said first and second axle casing portions at a surface of said other axle casing portion which is opposite to said hydraulic pump; and
   said bearing wall being provided with oil passages which connect said hydraulic pump and said hydraulic motor.

5. An axle driving apparatus as set forth in claim 1, further comprising a center plate fixedly sandwiched between said first and second axle casing portions;
   said hydraulic pump being attached to a lateral side surface of said center plate;
   said hydraulic motor being attached to another lateral side surfce of said center plate; and
   oil passages provided in said center plate for connecting said hydraulic pump and said hydraulic motor.

* * * * *

UNITED STATES PATENT AND TRADEMARK OFFICE
CERTIFICATE OF CORRECTION

PATENT NO.   :   4,856,368
DATED        :   August 15, 1989
INVENTOR(S)  :   Koichiro Fujisaki, et al.

It is certified that error appears in the above-identified patent and that said Letters Patent is hereby corrected as shown below:

Column 1, line 53, delete "experience" and insert --experienced-- therefor;

Column 4, line 23, delete "121" and insert --12a-- therefor;

Column 5, line 10, delete "casing portion" and insert --casings-- therefor;

Column 6, line 3, delete "casings" and insert --housing-- therefor;

line 10, delete "remained" and insert --remainder-- therefor;

lines 15, 16 and 23, delete "casing portion" and insert --casings-- in each instance therefor.

Signed and Sealed this

Third Day of July, 1990

Attest:

HARRY F. MANBECK, JR.

*Attesting Officer*   Commissioner of Patents and Trademarks